United States Patent
Kelley et al.

(10) Patent No.: US 6,890,640 B2
(45) Date of Patent: May 10, 2005

(54) PATTERNED HYDROPHILIC-OLEOPHILIC METAL OXIDE COATING AND METHOD OF FORMING

(75) Inventors: Kurtis C. Kelley, Washington, IL (US); Jill E. Rockwood, Washington, IL (US); Norval P. Thomson, Dunlap, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/105,647

(22) Filed: Mar. 25, 2002

(65) Prior Publication Data

US 2002/0187335 A1 Dec. 12, 2002

Related U.S. Application Data

(63) Continuation-in-part of application No. 09/454,378, filed on Dec. 3, 1999, now abandoned.

(51) Int. Cl.[7] .............................................. B32B 3/26
(52) U.S. Cl. ..................................... 428/315.5; 428/472
(58) Field of Search ........................... 428/304.4, 315.5, 428/315.7, 446, 469, 472; 165/133

(56) References Cited

U.S. PATENT DOCUMENTS

| | | | | |
|---|---|---|---|---|
| 4,885,113 A | * | 12/1989 | Gillberg-LaForce et al. ..... | 252/582 |
| 4,937,017 A | * | 6/1990 | Gillberg-LaForce et al. ..... | 252/582 |
| 5,141,806 A | * | 8/1992 | Koontz ..................... | 428/315.5 |
| 5,250,184 A | * | 10/1993 | Maier ........................ | 210/653 |
| 5,804,611 A | | 9/1998 | Takoh et al. | |
| 5,814,370 A | * | 9/1998 | Martino et al. ......... | 427/213.35 |
| 5,833,931 A | * | 11/1998 | Fromson et al. ............ | 422/177 |
| 5,852,096 A | * | 12/1998 | Heindl et al. ................ | 524/492 |
| 6,027,796 A | * | 2/2000 | Kondoh et al. .......... | 428/312.8 |
| 6,171,945 B1 | * | 1/2001 | Mandal et al. .............. | 438/622 |
| 6,204,202 B1 | * | 3/2001 | Leung et al. ............... | 438/781 |
| 6,204,424 B1 | * | 3/2001 | Yadav et al. ................ | 585/502 |
| 6,208,014 B1 | * | 3/2001 | Wu et al. .................... | 257/629 |
| 6,329,017 B1 | * | 12/2001 | Liu et al. ..................... | 427/240 |
| 6,592,764 B1 | * | 7/2003 | Stucky et al. ............... | 210/660 |
| 6,649,255 B1 | * | 11/2003 | Fain et al. ................ | 428/312.2 |
| 2002/0034626 A1 | * | 3/2002 | Liu et al. ................. | 428/312.6 |
| 2002/0034646 A1 | * | 3/2002 | Canham ..................... | 428/446 |
| 2002/0160207 A1 | * | 10/2002 | Kohmura et al. .......... | 428/446 |
| 2003/0152706 A1 | * | 8/2003 | Hawker et al. .......... | 427/383.5 |
| 2003/0166184 A1 | * | 9/2003 | Takahashi et al. .......... | 435/183 |
| 2003/0224156 A1 | * | 12/2003 | Kimer et al. ............ | 428/312.2 |

* cited by examiner

*Primary Examiner*—Kiley S. Stoner
(74) *Attorney, Agent, or Firm*—Finnegan, Henderson, Farabow, Garrett & Dunner

(57) ABSTRACT

A metal oxide coating has a nanotextured surface defined by a plurality of capillary openings arranged in a pattern on the surface of the coating. Each of the capillary openings have a diameter defined by a previously present organic macromolecule. The metal oxide coating is formed by depositing a solution containing uniformly dispersed micelles composed of amphiphilic molecules on a metal, oxide, or plastic substrate. The micelles are self-arranging, in solution, as a result of mutually repulsive electrostatic forces on the surface of the micelles, and form a uniformly patterned organic template when the solution is deposited on the surface of the substrate. A metal oxide coating is then applied to the substrate, which forms a ceramic monolayer that is a negative image of the organic template. The organic template is then removed, thereby forming a metal oxide coating having a plurality of macromolecular-sized apertures formed therein.

15 Claims, 2 Drawing Sheets

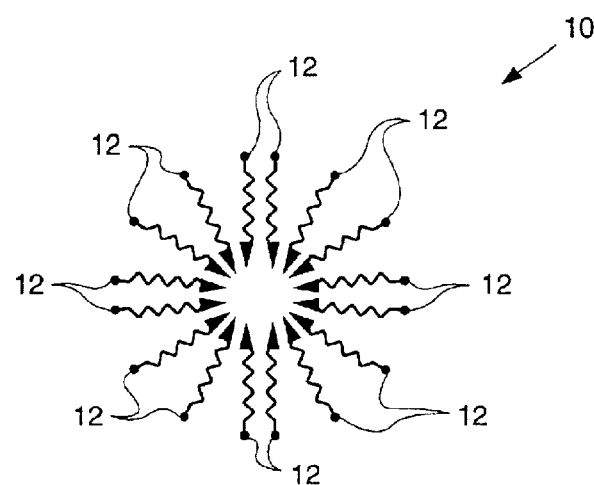
Fig-1-
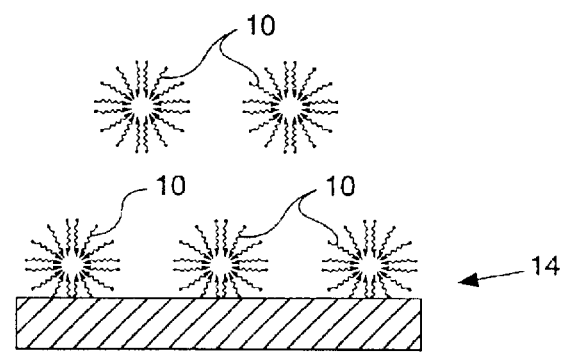
Fig-2-
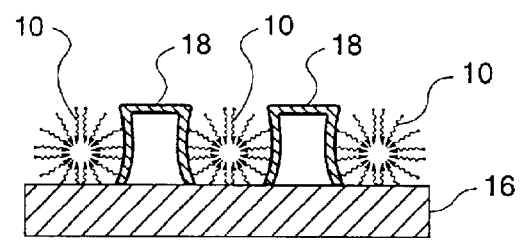
Fig-3-
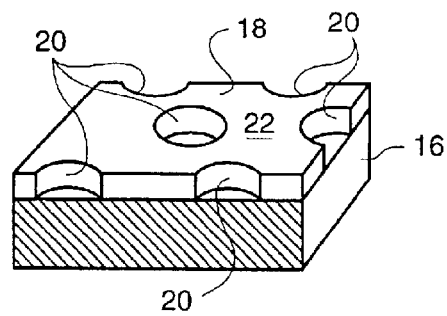
Fig-4-

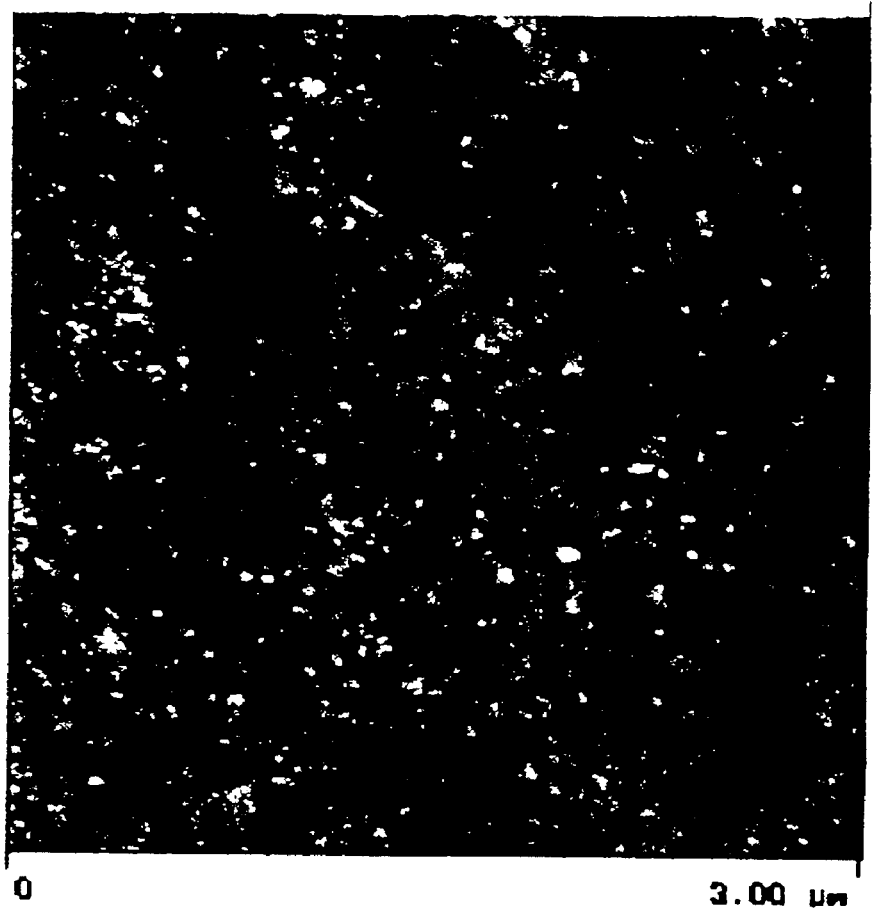
Fig_5_

PATTERNED HYDROPHILIC-OLEOPHILIC METAL OXIDE COATING AND METHOD OF FORMING

This application is a continuation-in-part of application Ser. No. 09/454,378 filed on Dec. 3, 1999, now abandoned.

TECHNICAL FIELD

This invention relates generally to a metal oxide coating and method of forming the coating by which the coating surface has hydrophilic and oleophilic properties, and more particularly to such a coating and method of forming the coating which provides a nanotextured surface defined by a plurality of macromolecular-sized openings on the surface of the coating.

BACKGROUND

In typical heat exchangers, water condenses out of the surrounding air onto the "cold" coils or surfaces of the heat exchanger. The condensed water has a tendency to "bead up" on the exchanger heat transfer surfaces as a result of the generally prevailing hydrophobic properties of the heat exchanger material, typically aluminum, and as a result considerable water is held in the exchanger, reducing heat transfer efficiency. [Additionally, the trapped water eventually evaporates back into the surrounding air during normal cycling, raising the humidity of the surrounding air. It is even possible under mild temperature conditions or a low refrigerant charge an air conditioning system, to actually raise the relative humidity of an enclosed structure where a condensing unit is housed.]

The present invention is directed to providing hydrophilic surfaces for heat exchanger coils, fins, and similar heat transfer surfaces. By making the heat exchanger surfaces hydrophilic, moisture condensed from the surrounding air wets the hydrophilic surface immediately and does not build up on the heat exchanger surfaces. Consequently, the condensed moisture rapidly drains from the heat transfer surfaces, improving heat transfer efficiency and reducing the amount of water available to re-evaporate into the surrounding air.

It has long been recognized that hydrophilic heat exchanger surfaces are desirable. For example, U.S. Pat. No. 4,664,182, issued May 12, 1987 to Miwa Kazuharu for HYDROPHILIC FINS FOR A HEAT EXCHANGER, describes a hydrophilic coating comprised of gelatin and a water soluble acrylic resin. However, such coatings are subject to deterioration when exposed over a period of time in a high-moisture environment. More recently, U.S. Pat. No. 5,514,478 was issued on May 7, 1996, to Sadashiv K. Nadkarni for NON-ABRASIVE, CORROSION-RESISTANT, HYDROPHILIC COATINGS FOR ALUMINUM SURFACES, METHODS OF APPLICATION, AND ARTICLES COATED THEREWITH. The Nadkarni patent describes a non-oxide, i.e., non-ceramic coating and therefore lacks the hardness, abrasion resistance, and wear resistance of a ceramic coating.

Also, in the field of nanotribology, it is known that the macroscopic laws governing friction are inapplicable to microscale patterned surfaces. More specifically, increased lubrication properties have been found with nanoscale structured surfaces. However, uniformly textured nanoscale surfaces have heretofore been difficult to form on a consistent and durable basis.

The present invention is directed to overcoming the problems set forth above. It is desirable to have a metal oxide coating that has hydrophilic and oleophilic surface properties. It is also desirable to have such a coating that has a uniformly patterned nanotextured surface having increased wetting and lubrication properties. It is also desirable to have a method for forming such a coating that is carried out at low temperature, is economical, and environmentally benign. It is also desirable to have such a method for forming hydrophilic and oleophilic coatings that is able to coat complex shapes, and porous as well as non-porous materials, uniformly. Further, it is desirable to have such a method that is compatible with a wide range of substrates, including metals and metal oxides, as well as plastics and other temperature-sensitive materials.

SUMMARY OF THE INVENTION

In accordance with one aspect of the present invention, a metal oxide coating comprises a film formed of a metal oxide having a nanotextured surface defined by a plurality of capillary openings on the surface of the film. Each of the capillary openings has a diameter of about 10 nanometers or less.

Alternatively, the invention may be characterized as a metal oxide coating, comprising a thin film formed of a metal oxide and having a nanotextured surface defined by a plurality of capillary openings on the thin film, wherein the thickness of the metal oxide film is substantially equal to the diameter of the capillary openings.

Further, the invention may be characterized as a metal oxide coated article comprising a substrate, a thin film metal oxide coating disposed on said substrate and having a nanotextured surface defining a plurality of capillary openings on the thin film metal oxide coating, wherein the thickness of the metal oxide film is substantially equal to the diameter of the capillary openings.

Other features of the metal oxide coating embodying the present invention include the metal oxide being silicon dioxide, titanium dioxide, or zirconium dioxide. Other features include the predefined macromolecule being formed of amphiphilic molecules. Other features include the amphiphilic molecules being molecules of a fatty acid. Still other features include the coating being deposited on a metallic substrate, such as aluminum.

Still other features of the metal oxide coating embodying the present invention include the coating having a hydrophilic surface on which water droplets deposited thereon have a contact angle of less than 10°. Another feature includes the coating having an oleophilic surface whereby oil droplets deposited on the surface have a contact angle of less than about 10°.

BRIEF DESCRIPTION OF THE DRAWINGS

A more complete understanding of the structure and processing steps of the present invention may be had by reference to the following detailed description when taken in conjunction with the accompanying drawings, wherein:

FIG. 1 is a schematic representation of a micelle formed in a preliminary step of the method of forming a metal oxide coating, in accordance with the present invention;

FIG. 2 is a schematic representation of a subsequent step in the method embodying the present invention, wherein the formed micelles are deposited on a substrate in a uniform pattern;

FIG. 3 is a schematic representation of a subsequent step in carrying out the method of forming an oxide coating, in accordance with the present invention, wherein a metal oxide material is deposited on the substrate in open areas between the previously deposited micelles;

FIG. 4 is a schematic representation of the metal oxide coating embodying the present invention, after removal of the micelles; and FIG. 5 is an atomic force microscope (AFM) image depicting the nanostructure of the thin film metal oxide coating having a plurality of capillaries disposed therein.

DETAILED DESCRIPTION

The following description is of the best mode presently contemplated for carrying out the invention. This description is not to be taken in a limiting sense but is made merely for the purpose of describing the general principals of the invention. The scope and breadth of the invention should be determined with reference to the claims.

In an illustrated embodiment of the present invention, organic templates are formed on a selected substrate, such as a metal, oxide, or plastic surface, with the use of fatty acids. Fatty acids belong to a group of molecules that are classified as amphiphilic. Amphiphilic molecules possess a nonpolar side, or end, and a polar side, or end. When such molecules are put into solution, i.e., water, the molecules arrange themselves according to their nonpolar/polar nature. Since water is a polar solvent, the amphiphilic molecules in solution form spheres with the polar ends on the outside, in contact with the water molecules, and the nonpolar ends tucked inside, hidden away from the water molecules. These spheres are referred to as micelles, generally indicated by the reference numeral 10 in FIG. 1 with the polarly arranged amphiphilic molecules indicated by the reference numeral 12.

The micelles 10, are organic macromolecules which have a submicroscopic structural configuration determined by the nonpolar-polar characteristics of the amphiphilic molecules 12. Since the amphiphilic molecules 12 arrange themselves according to their polarity to form the micelles 10, the polar charge on the surface of each micelle is identical, and the micelles 10 arrange themselves equidistantly from each other as the result of the repulsion forces between the like electrostatic charges.

The equally distributed micelles 10 are used to create a uniformly patterned template 14 on a selected substrate 16. Alternatively, a random patterned template can also be used on a selected substrate. When the aqueous solution, containing the micelles 10 is deposited on the surface of the substrate 16, the micelles 10 bond to the substrate 16 in a pattern, the spacing of which is determined by the strength of the electrostatic repulsion forces between the micelles 10 and the electrical charge conductivity characteristics of the solution in which the micelles are disposed. This forms the patterned organic template 14, as illustrated in FIG. 2.

After the organic patterned template 14 is formed, a selected metal oxide, such as silicon dioxide, titanium dioxide, or zirconium dioxide, represented by the reference numeral 18, is deposited on the templated substrate 16, as illustrated in FIG. 3. Metal oxides are classified as ceramics and accordingly are generally characterized by high hardness, wear resistance, corrosion resistance, abrasion resistance, and thermal stability. As can be seen from the illustration in FIG. 3, the oxide coating 18 attaches to the substrate 16 wherever the micelles 10 are not attached, thus creating a ceramic film which is a negative image of the template. The oxide coating can be applied by any conventional low-temperature processing method that does not damage or disturb the patterned organic template 14, such as by dipping, spraying or painting. The oxide coating 18 thus forms a monolayer having a thickness that is substantially equal to the thickness of the patterned template 14.

After deposition of the oxide coating 18, the organic template 14 is burned off at relatively low temperature, for example 300° C. to 400° C., producing the nanotextured, thin-film, coating illustrated in FIG. 4. As can be seen, the metal oxide coating 18 remaining after removal of the micelles 10 has a plurality of capillary openings 20 which define the nanotextured surface 22. Each of the capillary openings 20 have a diameter that is determined by the previously present, but now removed, organic macromolecule, or micelle 10.

It has also been found that adding a base compound to the aqueous solution in which the amphiphilic molecules 12, and accordingly the micelles 10, are dispersed enhances the uniformity of the distribution of the micelles 10 in the solution. The improved hydrophilic and oleophilic properties of the coating surface in which the micelle solution contained a base compound, is illustrated by improved wetting angle results in the examples presented as follows:

EXAMPLE 1

A thin film of titanium dioxide was deposited directly onto a glass slide, without any organic patterned template being previously formed on the slide, by immersing the slide into a 0.01M solution of titanium isopropoxide. The slide was then briefly immersed in ethanol and dried with a stream of nitrogen.

EXAMPLE 2

A glass slide was immersed into an 8×10−3M solution of nonanoic acid (an oily, fatty acid) in water. After a brief immersion, the slide was dried with a stream of nitrogen and then dipped into a 0.01M solution of titanium isopropoxide and water, followed by a brief immersion in ethanol, and then again dried in a stream of nitrogen.

EXAMPLE 3

A glass slide was immersed into an 8×10−3M solution of nonanoic acid and water in which the solution further contained 0.004M of sodium hydroxide. After a brief immersion in the aqueous solution containing the base compound, the slide was dried with a stream of nitrogen. As in Example 2, the slide was then dipped into a 0.01M solution of titanium isopropoxide, followed by a brief immersion in ethanol. The slide was then dried with a stream of nitrogen.

Following the preparation of the slides, as described in the above three examples, each of the slides were heated, along with a bare glass slide, i.e., an uncoated glass slide, to a temperature of about 343° C. whereby the organic (nonanoic acid) patterned template, if present, was removed as a result of thermal decomposition.

Each of the thus-prepared slides were then tested for respective hydrophilic and oleophilic properties by depositing glycerin, water, and oil droplets on each of the slides, and the wetting angle of the thus-deposited droplets measured. The measured contact angle on each of the slides, for glycerin droplets, water droplets, and oil droplets, was then measured. The results of those measurements is presented below in Table 1.

TABLE 1

|  | Measured Contact Angle (Degrees) | | |
|---|---|---|---|
|  | Glycerin | Water | Oil |
| Bare Glass | 39 | 37 | 13 |
| Non-template (Ex. 1) | 17 | 13 | 17 |
| Templated - no base (Ex. 2) | 52 | 47 | 17 |
| Micelle template (Ex. 3) | 10 | 6 | 6 |

Thus, it is readily apparent that the micelle templated slide, prepared as described in Example 3, has significantly lower contact angles for glycerin, water, and oil. The lower contact angles indicate that the droplets spread out over a larger area, resulting in dramatically improved wetting of the metal oxide surface. The nanostructure patterned surface of the metal oxide coating embodying the present invention therefore has both hydrophilic and oleophilic properties, and provides significant advantages in both heat transfer and lubrication applications. For example, in lubrication applications, the nanometer-scale patterned surface provides significant advantages on cold engine start-up, in that the nanostructured surfaces can be constructed so as to entrap oil within the small capillaries 20, and thereby provide lubrication on cold start-up, as well as provide improved wetting of contact surfaces during operation.

The above-described and illustrated procedure provides a self-assembled monolayer (SAM) in which the uniformly dispersed micelles 10 provide a template 14 that is removed after formation of the thin metal oxide coating 18. Using this technique, it can be seen that multiple monolayers, each being self-assemblying in nanoscale patterns, can be built up to any desired thickness by repetition of the steps described in carrying out the formation of a single monolayer.

J Israelachvili, Intermolecular & Surface Forces pp 371–372 (2d 1991) discusses sizes and volumes of various micelles. By way of example, according to the above reference, a micelle produced by a 12-carbon surfactant and water has a radius of about 1.84 nanometers or a diameter of about 3.84 nanometers. The micelles produced in Example 2, above, with a 9-carbon nonoanoic acid and water are estimated to have a diameter of about 3 nanometers. Larger micelles, having a diameter of up to about 10 nanometers would also work satisfactorily with the methods disclosed herein. FIG. 5 is an atomic force microscope (AFM) image that shows a random pattern of holes, several nanometers in diameter, in a titanium oxide coating on glass similar to that of Example 3, above. The thickness of the coating depicted in FIG. 5 is about 4.0 nanometers (in the Z direction).

Although the present invention is described in terms of a preferred exemplary embodiment, with illustrative examples in which titanium dioxide was employed as an oxide coating on a nonanoic acid patterned glass substrate, those skilled in the art will recognize that similar metal oxides, and in particular silicon dioxide and zirconium dioxide, along with other organic molecule patterned or random patterned templates, and other substrates including metallic, oxide and plastic substrates, may be employed without departing from the spirit of the invention.

From the foregoing, it can be seen that the disclosed embodiment provides a thin film metal oxide coating and associated article. While the embodiment herein disclosed has been described by means of specific components and methods or processes associated therewith, numerous changes, modifications, and variations could be made thereto by those skilled in the art without departing from the scope of the invention as set forth in the claims.

What is claimed is:

1. A metal oxide coating comprising a film formed of a metal oxide and having a nanotextured surface defined by a plurality of capillary openings on the surface of said film, each of said capillary openings having a diameter determined by a predefined organic macromolecule that forms a spherical micelle of less than about 10 nanometers, wherein said predefined organic macromolecule is formed of amphiphilic molecules, and said amphiphilic molecules are molecules of a fatty acid.

2. The metal oxide coating, as set forth in claim 1, wherein said metal oxide is selected from the group consisting of silicon dioxide, titanium dioxide and zirconium dioxide.

3. The metal oxide coating, as set forth in claim 1, wherein said coating is deposited on a metallic substrate.

4. The metal oxide coating, as set forth in claim 3, wherein said metallic substrate is aluminum.

5. The metal oxide coating, as set forth in claim 1, wherein said coating has a hydrophilic surface whereby water droplets deposited on said coating have a contact angle of less than 10 degrees.

6. The metal oxide coating, as set forth in claim 1, wherein said coating has an oleophilic surface whereby oil droplets deposited on said coating have a contact angle of less than 10 degrees.

7. The metal oxide coating, as set forth in claim 1, wherein said plurality of capillary openings on the surface of said film are arranged in a uniform pattern.

8. A metal oxide coating comprising a film formed of a material selected from the group consisting of titanium dioxide and zirconium dioxide and having a nanotextured surface defined by a plurality of capillary openings on the surface of said film, each of said capillary openings having a diameter determined by a predefined organic macromolecule that forms a spherical micelle of less than about 10 nanometers.

9. The metal oxide coating, as set forth in claim 8, wherein said predefined organic macromolecule is formed of amphiphilic molecules.

10. The metal oxide coating, as set forth in claim 9, wherein said amphiphilic molecules are molecules of a fatty acid.

11. The metal oxide coating, as set forth in claim 8, wherein said coating is deposited on a metallic substrate.

12. The metal oxide coating, as set forth in claim 11, wherein said metallic substrate is aluminum.

13. The metal oxide coating, as set forth in claim 8, wherein said coating has a hydrophilic surface whereby water droplets deposited on said coating have a contact angle of less than 10 degrees.

14. The metal oxide coating, as set forth in claim 8, wherein said coating has an oleophilic surface whereby oil droplets deposited on said coating have a contact angle of less than 10 degrees.

15. The metal oxide coating, as set forth in claim 8, wherein said plurality of capillary openings on the surface of said film are arranged in a uniform pattern.

* * * * *